United States Patent
Huang et al.

(10) Patent No.: US 7,643,108 B2
(45) Date of Patent: Jan. 5, 2010

(54) LIQUID CRYSTAL DISPLAY PANEL

(75) Inventors: Shui Huang, Hsinchu (TW); Wei-Chieh Sun, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 116 days.

(21) Appl. No.: 12/041,201

(22) Filed: Mar. 3, 2008

(65) Prior Publication Data

US 2008/0252807 A1    Oct. 16, 2008

(30) Foreign Application Priority Data

Apr. 13, 2007    (TW)    ............... 96113099 A

(51) Int. Cl.
*G02F 1/1333*    (2006.01)
(52) U.S. Cl. .................. 349/93; 349/149; 349/152
(58) Field of Classification Search .......... 349/93, 349/149, 152
See application file for complete search history.

(56) References Cited

U.S. PATENT DOCUMENTS

2002/0130989 A1    9/2002    Nakao et al.
2005/0078240 A1    4/2005    Murade

FOREIGN PATENT DOCUMENTS

| CN | 1591145 | 3/2005 |
|---|---|---|
| CN | 1696774 | 11/2005 |
| TW | 95132189 | 3/2008 |

OTHER PUBLICATIONS

Chinese language office action dated Oct. 24, 2008.
English language translation of abstract of TW 95132189.
Chinese language office action dated Feb. 20, 2009.
English language translation of abstract and pertinent parts of CN 1696774.

*Primary Examiner*—David Nelms
*Assistant Examiner*—Phu Vu
(74) *Attorney, Agent, or Firm*—Thomas, Kayden, Horstemeyer & Risley

(57) ABSTRACT

A liquid crystal display panel is provided. The panel comprises a first substrate and a second substrate which have a display area and a non-display area, which is located around the display area. The panel comprises a plurality of dummy pixel structures in the non-display area to provide a voltage for aligning the liquid crystal materials in the non-display area.

16 Claims, 6 Drawing Sheets

LIQUID CRYSTAL DISPLAY PANEL

This application claims the benefit of priority based on Taiwan Patent Application No. 096113099 filed on Apr. 13, 2007, the contents of which are incorporated herein by reference in their entirety.

CROSS-REFERENCES TO RELATED APPLICATIONS

Not applicable.

BACKGROUND OF THE INVENTION

1. Field of the Invention

The present invention relates to a liquid crystal display panel. More particularly, the present invention relates to a liquid crystal display panel that prevents light from leaking in through the edges.

2. Descriptions of the Related Art

Traditionally, for liquid crystal (LC) materials in a liquid crystal display (LCD) panel to respond synchronously and consistently during operation, the LC materials are often subjected to an alignment process. That is, the major axes of the LC materials are formed at a predetermined angle with respect to the substrate, and thus, exhibit uniform orientation or oriented alignment.

In general, there are roughly three alignment modes for LC materials in LCD panels. The first mode, which is called the Homogeneous Alignment, sets the major axes of the LC materials so that they are parallel to the alignment film. The second mode, which is called the Heterogeneous Alignment or Vertical alignment, sets the major axes of the LC materials so that they are perpendicular to the alignment film. Lastly, the third mode sets the major axes of the LC materials so that they tilt at a certain angle (i.e. a pre-tilt angle) with respect to the substrate. Because the pre-tilt angle affects the LCD panel display characteristics, an alignment process is often conducted after the liquid crystal materials are interposed between the two substrates of the LCD panel. As a result, the LC materials are aligned at a predetermined angle. One of these alignment processes is called the "phase separation alignment (PSA)" process.

FIG. 1A illustrates a schematic top view on a second substrate 113 in an LCD panel 100 of a prior art, while FIG. 1B illustrates a schematic cross-sectional view of an LCD panel of the prior art. Referring to the prior art, the LCD panel 100 has an LC layer 119 interposed between the first substrate 111 and the second substrate 113. The LC layer 119 comprises LC materials 1191 and macromolecular polymers 1195 made from a photopolymerization process. The first substrate 111 and the second substrate 113 that are in a display area 101 have first electrodes 1151 and second electrodes 1153 disposed therein respectively, while the non-display area 103 at the edge of the display area 101 does not. Consequently, during the PSA process, the required voltage for alignment can only be applied in the display area 101 to align the LC material 1191 therein. In contrast, since there is no required voltage for alignment in the non-display area 103, the LC materials 1191 therein will tilt randomly as illustrated in FIG. 1B. The random tilt of the LC materials 1191 in the non-display area 103 leads to red light leaking in through the edges (e.g., at the border between the display area and the non-display area) of the LCD panel 100, which is especially significant when being viewed from the side. As a result, the panel display is no longer accurate.

Because LCD panels of the prior art do not align the LC materials at the edge of the display area, red light leakage commonly occurs when being viewed from the side. Thus, it is important for the LC materials at the edge of the display area to align during a PSA process so that the LCD panel is not subjected to the leaking in of red light from the edges.

SUMMARY OF THE INVENTION

One objective of the present invention is to provide a liquid crystal display panel with a first substrate and a second substrate, wherein the first substrate and the second substrate both have a display area and a non-display area that is located around the display area. The liquid crystal display panel comprises the following: (1) a liquid crystal layer interposed between the first substrate and second substrate, in which the liquid crystal layer is made of liquid crystal materials and polymers; (2) a plurality of pixel structures positioned in the display area; (3) a plurality of dummy pixel structures positioned in the non-display area, wherein the pixel structures have the first electrodes positioned on the first substrate and the second electrodes positioned on the second substrate; (4) dummy pixel structures with first dummy electrodes positioned on the first substrate and second dummy electrodes positioned on the second substrate, the first dummy electrodes being corresponding to the second dummy electrodes.

The first electrodes and the second electrodes provide a first voltage for aligning the liquid crystal materials in the liquid crystal layer of the display area during polymerization of the polymers; and the first dummy electrodes and the second dummy electrodes provide a second voltage for aligning the liquid crystal materials in the liquid crystal layer of the non-display area during polymerization of the polymers.

Another objective of the present invention is to provide a liquid crystal display panel with a display area and a non-display area that is located around the display area. The liquid crystal display panel comprises the following: (1) a plurality of pixel structures positioned into the display area; and (2) a plurality of dummy pixel structures positioned into the non-display area; wherein each of the dummy pixel structures provides a voltage for aligning the liquid crystal molecules in the dummy pixel structures during the phase separation alignment.

To achieve these objectives, technical features and advantages of the present invention more apparent, a description of the preferred embodiments thereof will be made in detail hereinafter in conjunction with the attended drawings.

DESCRIPTION OF THE PREFERRED EMBODIMENT

Figure 1A:
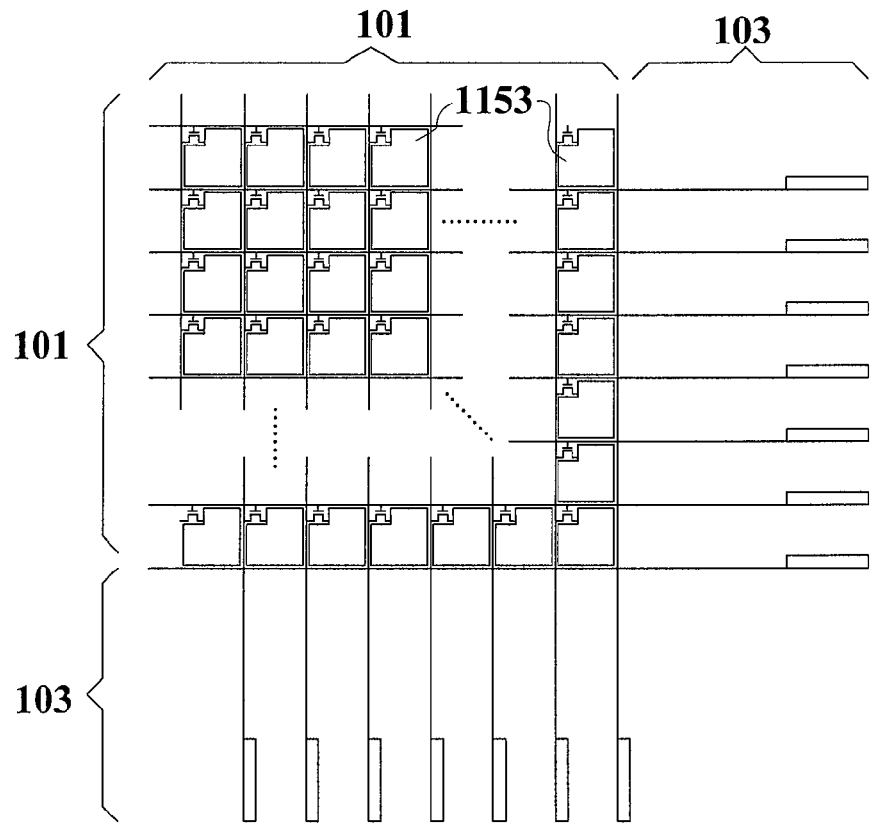
FIG. 1A is a schematic top view of a substrate in a conventional LCD panel.
Figure 1B:
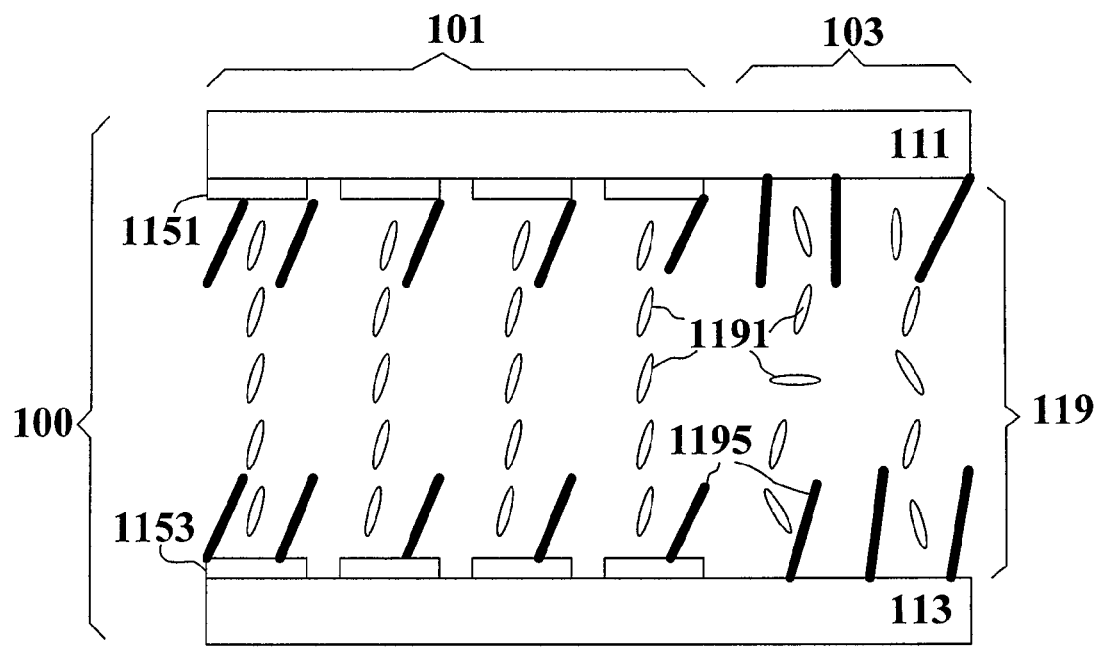
FIG. 1B is a schematic cross-sectional view of a conventional LCD panel.
Figure 2A:
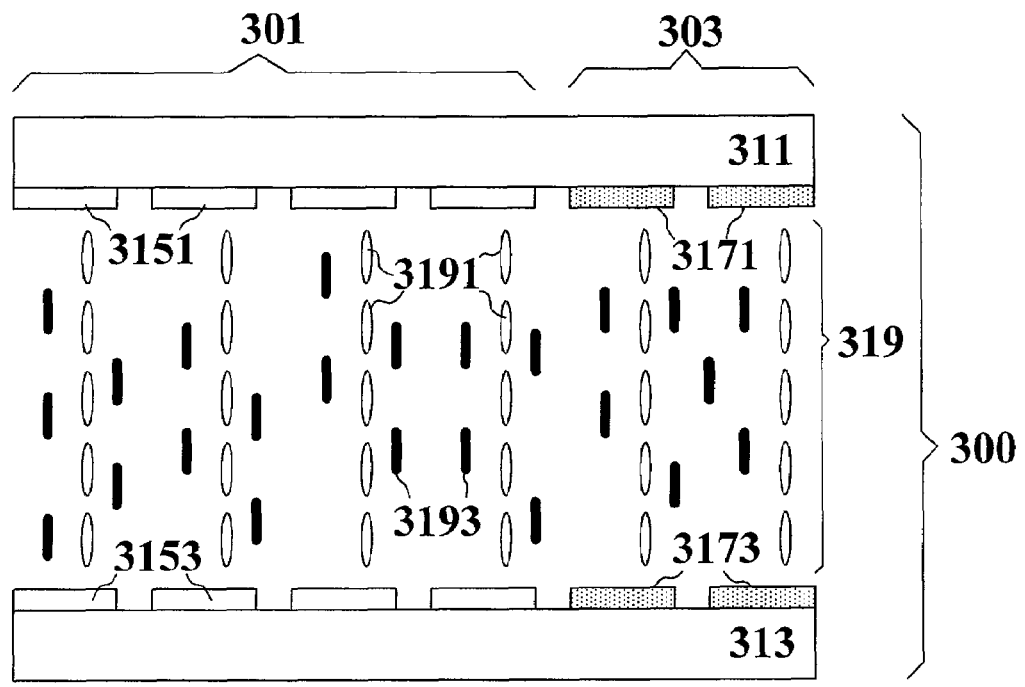
FIG. 2A is a schematic cross-sectional view of an LCD panel in accordance with the present invention before the alignment process.

FIG. 2A illustrates a cross-sectional view of the LCD panel 300. The LCD panel 300 has a display area 301 and a non-display area 303 that is located around the display area 301. The LC materials in the non-display area 303 can be aligned to correspond to those in the display area 301, and thus, prevent light from leaking into the display panel. The structure of the non-display area 303 will be described in detail hereinafter. The LCD panel 300 comprises a first substrate 311, a second substrate 313, a plurality of pixel structures disposed in the display area 301, and a plurality of dummy pixel structures disposed in the non-display area 303. The pixel structures comprise first electrodes 3151 and second electrodes 3153, while the dummy pixel structures comprise first dummy electrodes 3171 and second dummy electrodes 3173. In general, the display area 301 has pixel structures over the entire area, while the non-display area 303 may have dummy pixel structures covering only part of or the entire area. If the dummy pixel structures only cover part of the area, the structures are usually disposed on the border between the non-display area 303 and the display area 301. The non-display area 303 also has a shelter (not shown), such as a black matrix, which shields the display from unnecessary colored light radiating from the non-display area 303 during operation.

The pixel structures have first electrodes 3151 that are disposed on the first substrate 311. The second electrodes 3153 disposed on the second substrate 313 correspond to the first electrodes 3151. Similarly, the dummy pixel structures have first dummy electrodes 3171 disposed on the first substrate 311. Likewise, the second dummy electrodes 3173 disposed on the second substrate 313 correspond to the first electrodes 3151. The dummy pixel structures may or may not be electrically connected to the pixel structures. For example, if the dummy pixel structures are electrically connected to the pixel structures, the first dummy electrodes 3171 will be electrically connected to the first electrode 3151. Otherwise, if they are not electrically connected, the dummy pixel structures and the pixel structures can be supplied with different voltages. As a result, the LC alignment of the non-display area 303 and the display area 301 can be controlled separately during the alignment of the LC layer 319. Interposed between the first substrate 311 and the second substrate 313 is an LC layer 319, which is comprised of LC materials 3191 and polymers 3193. Generally, the LC materials 3191 and polymers 3193 need to be uniformly mixed before filling in between the first substrate 311 and the second substrate 313 to form the LC layer 319. In the present embodiment, the polymers 3193 are macromolecular monomers of a photopolymerizable material that will not react with the LC materials 3191 and thereby, result in good alignment and a quick curing speed.

Figure 2B:
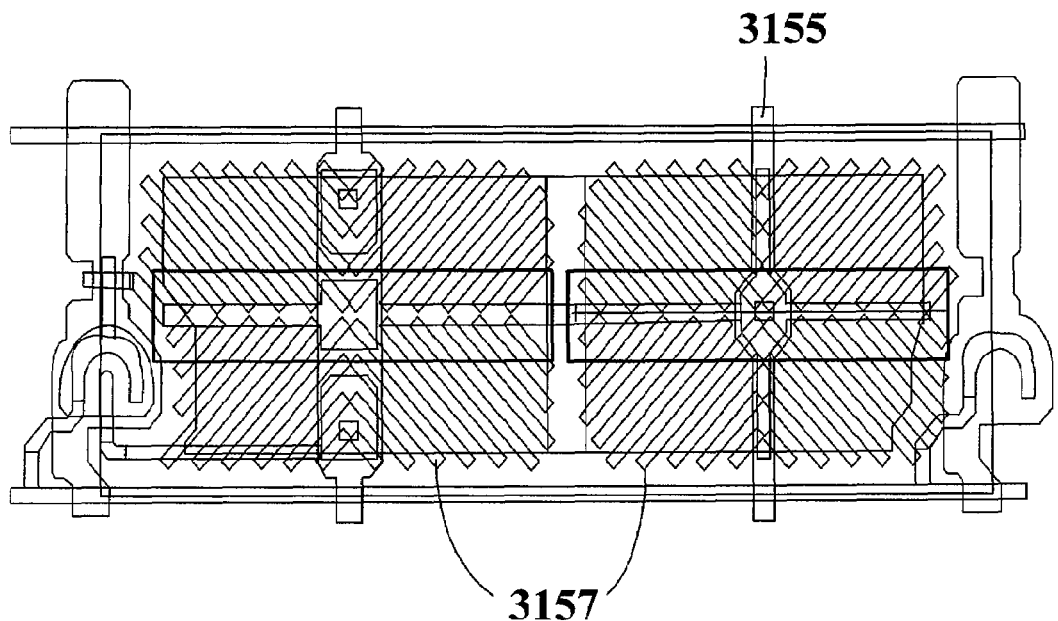
FIG. 2B is a schematic top view of an electrode in an LCD panel in accordance with the present invention.

FIG. 2B illustrates a schematic top view of the second electrodes 3153. As can be seen from the figure, the second electrodes 3153 comprise common electrodes 3155 and pixel electrodes 3157. The main function of the second electrodes 3153 is to correspond to the first electrodes 3151 to induce an electric field for controlling the tilt angle of the LC materials therebetween. The pixel electrodes 3157 typically have a plurality of grooves (not shown), such as channels, holes, etc., which assist in the alignment of the LC materials 3191. Since the LC crystal materials 3191 are stripe-like molecules which have major axes, once located in the grooves, their major axes will be aligned according to the orientation and angle of the grooves. Adjacent LC molecules will also be pulled, such that all the LC molecules adjacent to the grooves are aligned according to the orientation and angle thereof. In addition, the dummy pixel structures and the pixel structures may have identical or different structures. For example, the dummy pixel structures may have a simpler structure than the pixel structures.

Figure 2C:
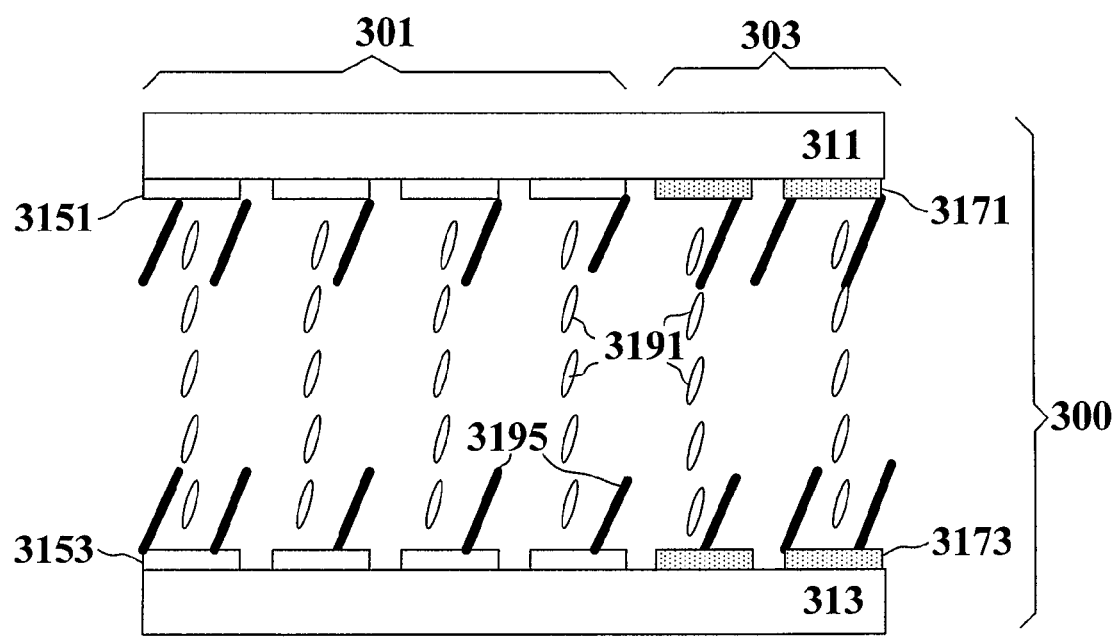
FIG. 2C is a schematic cross-sectional view of an LCD panel in accordance with the present invention after the alignment process.

In FIG. 2C, when the alignment process is conducted on the LC materials 3191, the first electrodes 3151 and the second electrodes 3153 cooperate to supply a first voltage required for the alignment of LC materials 3191 in the display area 301, while the first dummy electrodes 3171 and the second dummy electrodes 3173 cooperate to supply a second voltage required for the alignment of LC materials 3191 in the non-display area 303. During the alignment process, the respective voltages supplied by said electrodes induce respective electric fields, which will align the LC materials 3191 in the display area 301 and the non-display area 303 along a respective predetermined orientation. The first voltage and second voltage may be identical or different in value, and thus, may induce an identical or different electric field in the respective areas. As a result, the LC materials 3191 in the non-display area 303 and the display area 301 oriented identically or differently. For instance, through the control of the electric fields, the LC materials 3191 in the non-display area 303 and those in the display area 301 may be aligned along different alignment orientations, such that the LC materials 3191 in the display area 301 are aligned along the optimal orientation. The light from the non-display area 303 will not interfere with the normal display in the display area 301. Furthermore, each of the pixel electrodes 3157 can be subdivided into a number of sub-areas that will generate electric fields of different strengths, thereby, causing different alignments in different sub-areas.

Figure 3:
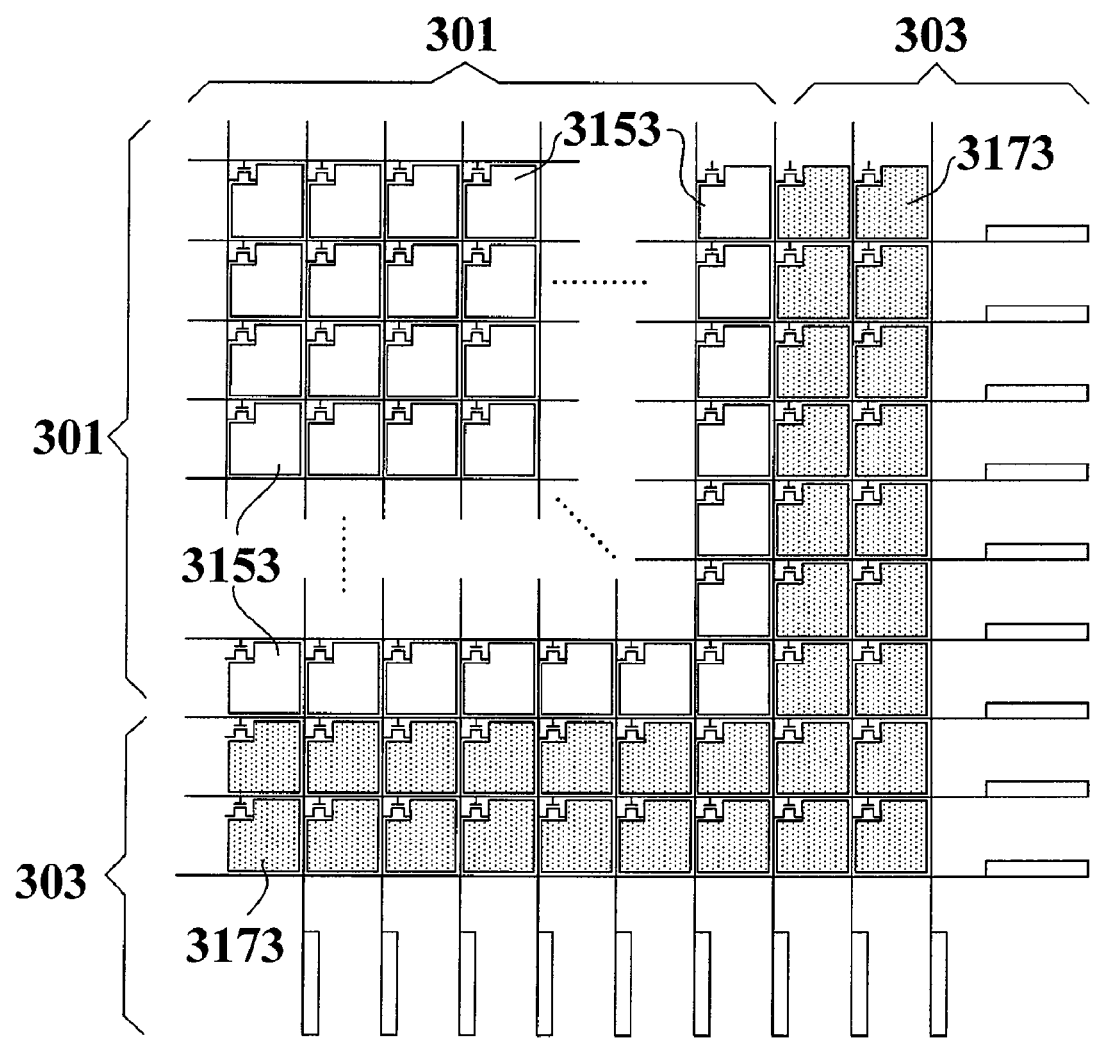
FIG. 3 is a schematic top view of an LCD panel in accordance with the present invention.

A schematic top view of the second substrate 313 in the LCD panel 300 of the present invention is illustrated in FIG. 3, which illustrates the arrangement pattern of the electrodes in the display area 301 and the non-display area 303 being located around the display area 301. The display area 301 has second electrodes 3153 over the entire area, while the non-display area 303 may have the second dummy electrodes 3173 covering only a portion of or the entire area. The LC materials can be aligned as required, thereby, preventing light from leaking into the borders between the display area 301 and the non-display area 303. Also, a shelter (not shown), such as a black matrix, is often provided in the non-display area 303 to prevent unnecessary light from the non-display area 303 from interfering with the normal display of the LCD panel.

Figure 4A:
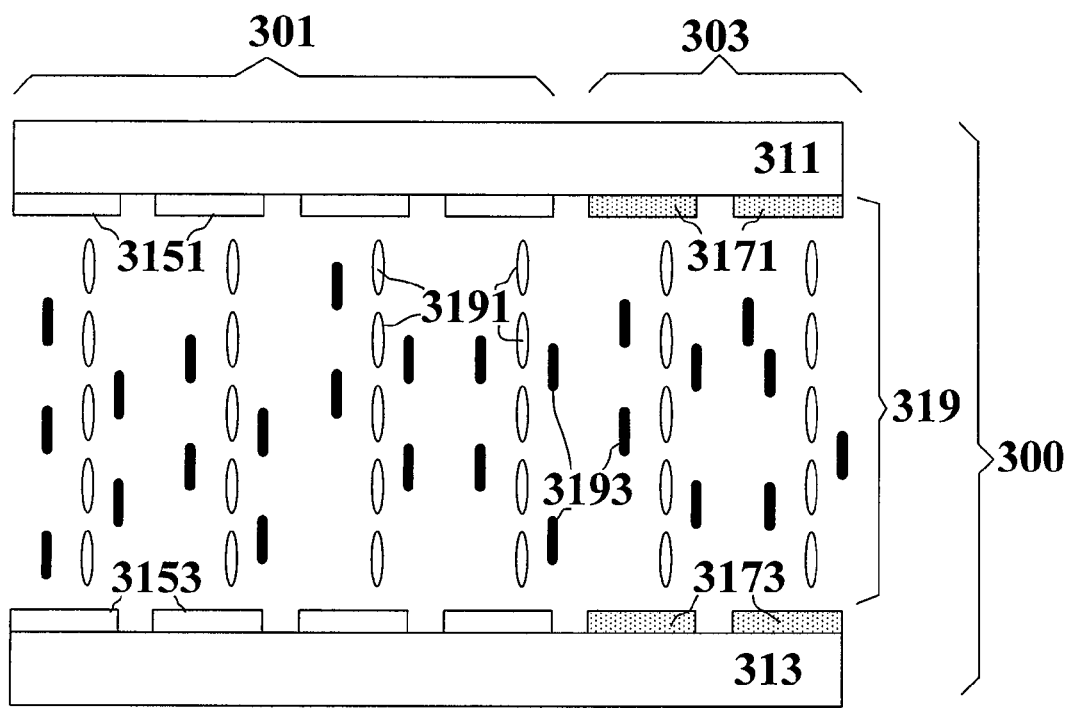
FIG. 4A-4D are schematic cross-sectional views showing different stages of the phase separation alignment (PSA) process for an LCD panel in accordance with the present invention.
Figure 4B:
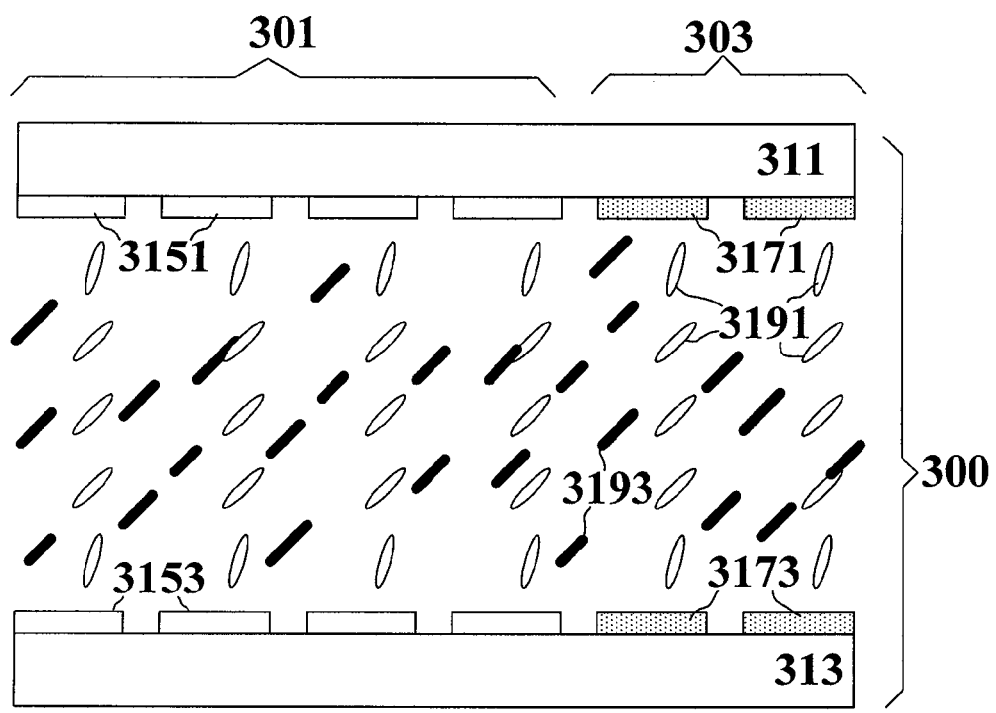
Figure 4C:
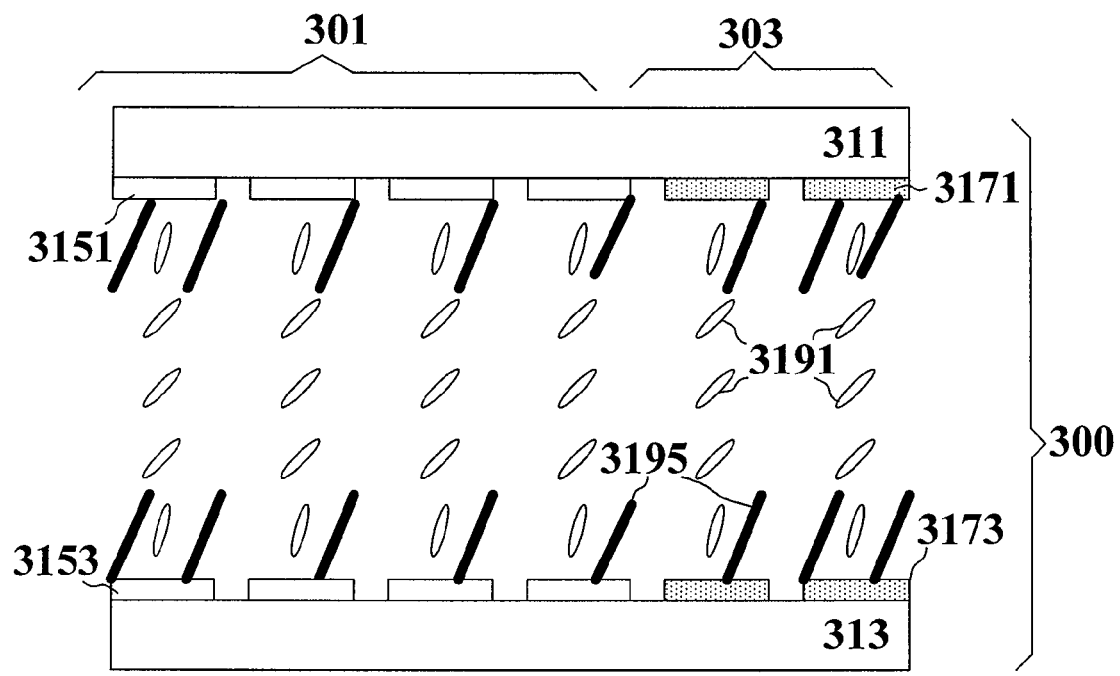
Figure 4D:
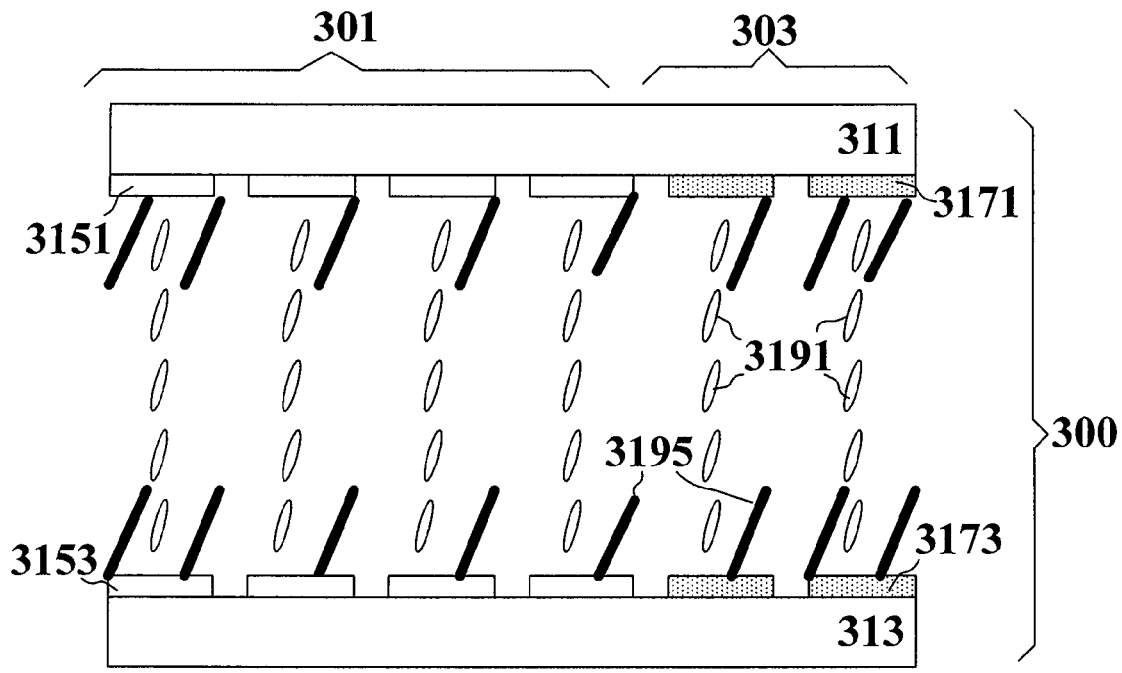

A brief description of the phase separation alignment (PSA) process will now be detailed. In FIG. 4A, the first substrate 311 of the LCD panel 300 has a plurality of first electrodes 3151 and a plurality of first dummy electrodes 3171, while the second substrate 313 has a plurality of second electrodes 3153 and a plurality of second dummy electrodes 3173. In addition to the LC materials 3191, polymers 3193 are also interposed between the first substrate 311 and the second substrate 313. Specifically, the LC materials 3191 and the polymers 3193 are first uniformly mixed and then the mixture is interposed between the substrates 311, 313 to form an LC layer 319. The polymers 3193 are made up of macromolecule monomers that will not react with the LC materials and are able to align well with a quick curing speed. FIG. 4B illustrates a schematic view of the tilt between the LC materials 3191 and the polymer 3193 after a voltage is applied across the two substrates 311, 313. Due to electric field between the substrates 311, 313, and the electrical anisotropism of the LC materials 3191, the LC materials 3191 are aligned parallel to the electric field, and thus, the alignment angle of the LC materials 3191 can be controlled. That is, in FIG. 4B, the tilt angle of the LC materials 3191 indicates the direction of the electric field. Next, in FIG. 4C, the polymerization reaction of the polymer 3193 begins to occur, for example, through exposure to ultraviolet light. As the chain length of the macromolecular monomers in the polymers 3193 grows, the solubility between the LC materials 3191 and the polymers 3193 decreases and eventually leads to a phase separation therebetween. After the phase separation between the LC materials 3191, the polymers 3193 migrate towards the substrates 311, 313, and polymerize on both substrates to eventually form a plurality of macromolecular polymers 3195 with a length of 1000 angstrom (Å). The polymers exhibit the same tilt angle in accordance with the alignment angle of the LC materials 3191. Finally, in FIG. 4D, after removing the voltage used to control the pre-tilt angle, the LC materials 3191 will maintain a certain pre-tilt angle due to the same angles produced by the macromolecular polymers. Thus, the LC materials 3191 have been pre-tilted.

In summary, by using dummy pixel structures in the non-display area, the present invention can be effectively used to align the LC materials during the PSA alignment process, thereby, preventing light from leaking into the non-display area of the LCD panels. However, the embodiments described above are provided only as examples to illustrate the principle and effect of the present invention and to explain the technical features thereof. The embodiments are not meant to limit the scope of the present invention. Modifications and equivalent arrangements can be readily made by those skilled in the art without departing from the technical principal and spirit of the invention, all of which shall still fall within the scope claimed by the invention. Accordingly, the scope of the invention shall only be defined by the amended claims.

What is claimed is:

1. A liquid crystal display panel having a first substrate and a second substrate, the first substrate and the second substrate both having a display area and a non-display area located around the display area, the liquid crystal display panel comprising:
    a liquid crystal layer being disposed between the first substrate and the second substrate, wherein the liquid crystal layer has liquid crystal materials and polymers;
    a plurality of pixel structures being positioned in the display area;
    a plurality of dummy pixel structures being positioned in the non-display area;
        wherein the pixel structures have first electrodes being positioned on the first substrate and second electrodes being positioned on the second substrate, the first electrodes are corresponding to the second electrodes;
        the dummy pixel structures have first dummy electrodes being positioned on the first substrate and second dummy electrodes being positioned on the second substrate, the first dummy electrodes are corresponding to the second dummy electrodes;
    wherein the first electrodes and the second electrodes provide a first voltage for aligning the liquid crystal materials in the liquid crystal layer of the display area during polymerization of the polymers; and the first dummy electrodes and the second dummy electrodes provide a second voltage for aligning the liquid crystal materials in the liquid crystal layer of the non-display area during polymerization of the polymers.

2. The liquid crystal display panel as claimed in claim 1, wherein the dummy pixel structures and the pixel structures are the same in structures.

3. The liquid crystal display panel as claimed in claim 1, wherein the dummy pixel structures and the pixel structures are different in structures.

4. The liquid crystal display panel as claimed in claim 1, wherein at least one of the first electrodes and the second electrodes has a common electrode.

5. The liquid crystal display panel as claimed in claim 1, wherein at least one of the first dummy electrodes and the second dummy electrodes has a common electrode.

6. The liquid crystal display panel as claimed in claim 1, wherein at least one of the pixel structures and the dummy pixel structures has a pixel electrode.

7. The liquid crystal display panel as claimed in claim 6, wherein the pixel electrodes have a plurality of grooves for aligning the liquid crystal material.

8. The liquid crystal display panel as claimed in claim 1, wherein the alignments of the liquid crystal in the non-display area and in the display area are the same in aligning directions.

9. The liquid crystal display panel as claimed in claim 1, wherein the alignments of the liquid crystal in the non-display area and in the display area are different in aligning directions.

10. The liquid crystal display panel as claimed in claim 1, wherein the polymerization of the polymers results from the phase separation alignment.

11. A liquid crystal display panel having a display area and a non-display area located around the display area, the display area and the non-display area both having a plurality of liquid crystal molecules, the liquid crystal display panel comprising:
    a plurality of pixel structures being positioned into the display area; and
    a plurality of dummy pixel structures being positioned into the non-display area;
    wherein the dummy pixel structures provide a voltage for aligning the liquid crystal molecules in the dummy pixel structures during phase separation alignment.

12. The liquid crystal display panel as claimed in claim 11, wherein the dummy pixel structures and the pixel structures are the same in structure, and the display area is electrically connected to the non-display area.

13. The liquid crystal display panel as claimed in claim 11, wherein the dummy pixel structures are positioned in a border zone between the display area and the non-display area.

14. The liquid crystal display panel as claimed in claim 11, wherein the non-display area comprises a shelter.

15. The liquid crystal display panel as claimed in claim 14, wherein the shelter is a black matrix.

16. The liquid crystal display panel as claimed in claim 14, wherein the dummy pixel structures are positioned under the shelter.

* * * * *